Dec. 18, 1934.   J. B. DAVIDSON   1,984,399
DEVICE FOR CONTROLLING THE RELATIVE SPEED OF TWO TRACTION MEMBERS
Filed Nov. 25, 1930

Inventor
Jay Brownlee Davidson
by Orwig & Hague Attys

Patented Dec. 18, 1934

1,984,399

UNITED STATES PATENT OFFICE 1,984,399

DEVICE FOR CONTROLLING THE RELATIVE SPEED OF TWO TRACTION MEMBERS

Jay Brownlee Davidson, Ames, Iowa

Application November 25, 1930, Serial No. 498,081

3 Claims. (Cl. 180—18)

This invention relates to improvements in self-propelled traction devices of that type having a pair of continuously operated traction members or wheels, and particularly of the type employing a differential gear for driving the traction devices.

In this type of self-propelled vehicles or traction devices considerable difficulty has been experienced due to the fact that one of the traction members is free to rotate relative to the other. In case one of said traction members should engage a slippery surface, the vehicle would be advanced at a reduced speed, or in some cases no advance would be made over the ground surface. It is well known that the tractive force or pull of a tractor is approximately twice the traction of the traction member having the least traction on the ground surface. It is often necessary to apply outside power to cause the vehicle to be advanced until the wheels engage the proper ground surface.

It is, therefore, the object of my invention to provide auxiliary means to be used in connection with the traction members, whereby the said traction members may be positively operated at fixed speeds relative to each other, and in connection therewith means whereby the relative speed of one traction device may be varied relative to the other; and to provide in connection therewith means automatically controlled by the steering of the traction device or vehicle whereby the relative speed or speed ratio of the two traction devices will be automatically controlled in such manner that the speed ratio of the two traction members will correspond with the speed ratio of the length of the paths traveled by the traction members, so that in case one of the traction members should slip, or tend to slip, the power applied to the differential will be delivered to the wheel having the greatest amount of traction in such manner that the vehicle may be advanced.

A further object is to provide means whereby the steering of the traction device may be more easily accomplished.

This invention consists in the construction, arrangement and combination of the various parts of the device, whereby the objects contemplated are attained, as hereinafter more fully set forth, pointed out in the claims, and illustrated in the accompanying drawing, in which:

Figures 1, 2, 3, 4:
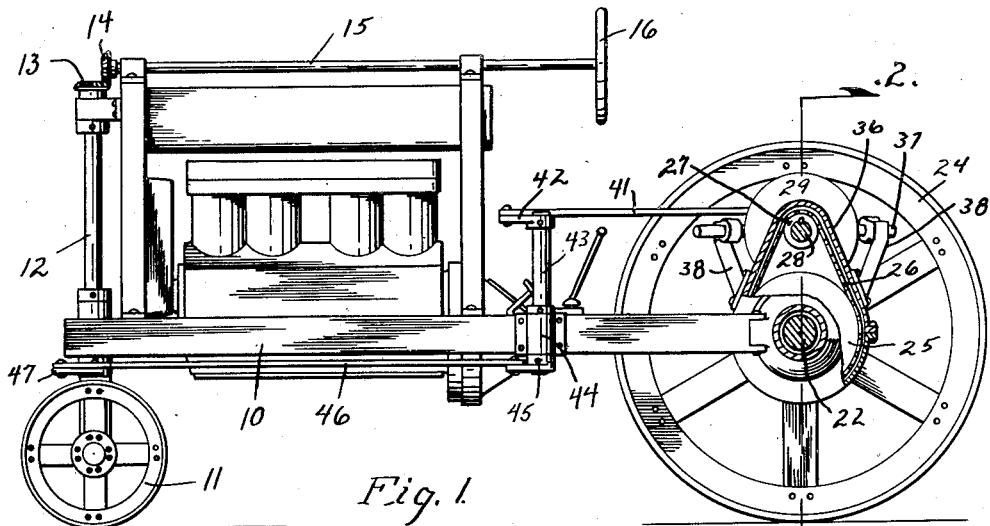
Figure 1 is a side elevation of a tractor showing the manner in which my improved mechanism is applied thereto.
Figure 2 is a plan view of the tractor frame showing the manner in which my improved device is applied, a portion of one of the gear casings being broken away.
Figure 3 is a detail sectional view taken on the line 3—3 of Figure 1.
Figure 4 shows a modified form of the mechanism for controlling the speed ratios.

In the drawing I have illustrated my device applied to a tractor of the type used for farm work. The numeral 10 indicates the horizontal frame of the tractor which is provided at its forward end with steering wheels 11 supported by a vertically arranged shaft 12. The upper end of the shaft is provided with a beveled gear 13 to operate with a bevel 14. The bevel 14 is mounted on a shaft 15 having at its rear end a steering wheel 16. Said shafts 12 and 15 and the gears 13 and 14 provide means for steering the wheels 11 in the usual manner.

The rear end of the frame 10 is provided with an axle housing 17 in which is included a differential gear mechanism of the ordinary type. Driven by means of the engine 52 is a shaft 19 to which a bevel pinion 20 is connected, operating a bevel gear 21 of the differential gear mechanism. The housing 17 also supports axle members 22 and 23, each of which is provided with a traction wheel 24. By this arrangement means is provided for rotating the traction wheels 24 from the shaft 19 with an equal amount of power.

Secured to the inner end of the shaft 22 is a sprocket 25 designed to operate a chain 26 passing over a sprocket 27 mounted on the shaft 28. Said shaft 28 has on its inner end a friction disk 29. The shaft 23 is provided with a sprocket 30 designed to operate a chain 31 passing over a sprocket 32 mounted on a shaft 33 and supporting on its inner end a friction disk 34. Both of said friction disks have their friction surfaces conical. The shafts 28 and 33 are mounted in bearings 35 carried by the gear housing 36. The inner faces of the disks 29 and 34 are spaced apart a slight distance to permit a shaft 37 to be supported horizontally between the disks and parallel with the opposite faces of the opposite disks, in the manner clearly illustrated in Figure 2. Said shaft is rotatively and slidably mounted in suitable bearings 38.

The central portion of the shaft 37 has friction wheels 39 and 40. The friction wheel 40 is designed to engage the friction surface of the disk 34 and the wheel 39 to engage the surface of the disk 29. Link mechanism 41 is provided for sliding the friction wheels longitudinally. The forward end of the link 41 is pivotally connected to a rock arm 42 secured to the upper end of the shaft 43 which is rotatively mounted in a suitable bearing 44 secured to the frame member 10. The lower end of the shaft 43 is provided with a rock arm 45 to which a link 46 is connected.

The forward end of the link 46 is pivotally connected to an arm 47 secured to the shaft 12 in such a manner that as the front wheels 11 are steered, the friction wheels 39 and 40 will be moved longitudinally of the shaft 37, in such manner that the speed ratio of the disks may be varied.

It will be seen in Figure 2 that if the link 41 is moved rearwardly, then the friction wheel 39 will be moved toward the center of the disk 29, while the friction wheel 40 will be moved away from the center of the disk 34, a reverse movement taking place when the link 41 is moved forwardly.

Means may be provided in the actual construction of device whereby pressure between the friction wheel and the coacting disks may be applied or relieved in a manner common to friction devices of this type. This is not illustrated herein inasmuch as it forms no part of this invention, and under certain operating conditions will not need to be used.

The practical operation of my device is as follows:

Assuming that the shaft 19 is being rotated continuously by power derived from the tractor engine or other suitable source, then the traction wheels 24 will be rotated under equal torque, due to the action of the differential gear. Ordinarily the forward end of the tractor would be free to swing laterally in either direction, and one wheel would be free to rotate freely relative to the other in case it should strike a slippery surface which would result in no advancement of the tractor. However, with my device this difficulty is overcome.

The rotation of the axles 22 and 23 will cause the disks 29 and 34 to be rotated in unison therewith, and rotation to be imparted to the friction wheels 39 and 40, both of which are secured to the shaft 37 in such a manner that if one of the traction wheels 24 engaged a slippery surface, then the traction wheel engaging said slippery surface would only be permitted to rotate at the proper speed ratio, determined by the longitudinal position of the friction wheels 39 and 40, so that power would be applied to the wheel firmly engaging the ground surface.

If the tractor is being advanced straight ahead, then the friction wheels 39 and 40 will be spaced equidistantly from the common center of the disks 29 and 34, and the traction wheels 24 operated at the same speed and the tractor will have a natural tendency to advance forwardly in a straight line. Therefore, constant attention by the operator is not necessary to maintain the tractor in a straight line movement.

If the steering shaft 12 is rotated and the wheels 11 rotated to steer the forward end of the tractor to the left, then the outer end of the lever 47 will be moved forwardly, causing the link 46 to be moved forwardly and the link 41 to be moved rearwardly through the action of the arms 42 and 45, which in turn would cause the friction wheels 39 and 40 to be moved rearwardly, and varying the speed ratio of the two friction disks in such manner that the left hand traction wheel 24 would operate at a higher speed than the right hand traction wheel, thereby causing the tractor to naturally assume a curved path and to maintain the said curved path so long as the steering mechanism remains in said steering position.

The length of the arms 42, 45 and 47 is such that the friction wheels 39 and 40 will be moved just the right amount, whereby the speed ratio between the friction disks will be equal to the ratio of the lengths of the paths traveled by the traction wheels, regardless of the position of the steering wheels. Thus means is provided whereby the traction wheels might be considered as being frictionally fixed at such speed ratios as the wheels would naturally assume when being advanced over the ground surface, either in a straight line or in a curved path.

Thus it will be seen that I have provided means whereby the steering of the tractor may be more easily accomplished, and whereby the tractor will have a tendency to follow a given steering position as controlled by the steering mechanism, whereby the steering of the tractor may be more easily accomplished; and further I have provided means whereby slippage of one of the traction members may be eliminated to such an extent as to cause the tractor to become inoperative, even if one of the wheels should engage a slippery surface.

In Figure 4 I have illustrated a slightly modified form of friction device which comprises a pair of disks 48 supported by shafts 49, one of said shafts being set ahead of the other in such manner that a single friction wheel 50 may be employed for engaging the diametrically opposite faces of said disk, whereby the said disks may be made to rotate in a common direction. The friction wheel 50 is moved longitudinally in the same manner as provided for the friction wheels 39 and 40.

While I have illustrated and described my improved device as being applied to a farm tractor, it will readily be seen that it may be applied to other forms of traction devices without departing from the spirit of this invention.

I claim as my invention:

1. In combination, a self-propelled vehicle, steering wheels for said vehicle, means for steering said wheels, traction wheels, an axle fixed to each traction wheel, an engine, means for operatively connecting said engine to said axles, said means including a differential gear, a pair of friction disks, one for each axle, means for operatively connecting each disk with a corresponding axle, friction wheels operatively connecting said disks and adjustably mounted whereby the disks and the traction wheels may be made to operate at the same speed or at various speeds one relative to the other, and means actuated by said steering means for adjusting the position of said friction wheels.

2. In combination, a self propelled vehicle, steering wheels for said vehicle, means for steering said wheels, traction wheels, an axle fixed to each traction wheel, an engine, means for operatively connecting said engine to said axle, said means including a differential gear, a pair of friction disks supported above said differential gear, one for each axle, a sprocket pinion carried by each disk, a sprocket gear carried by each axle, chain connecting the corresponding sprocket gears and pinions, friction wheels operatively connecting said disks and adjustably mounted whereby the disks and traction wheels may be made to operate at the same speed or at various speeds one relative to the other, and means actuated by said steering means for adjusting the position of said friction wheels.

3. In combination, a self-propelled vehicle, steering wheels for said vehicle, means for steering said wheels, traction wheels, a differential gear operatively connecting said wheels, means for driving said differential gear, a pair of friction disks, one for each traction wheel, means for operatively connecting each disk with a corresponding traction wheel, friction means operatively connecting said disks and adjustably mounted whereby the disks and the traction wheels may be made to operate at the same or at various speeds one relative to the other, and means actuated by the said steering means for adjusting the position of said friction means.

JAY BROWNLEE DAVIDSON.